United States Patent [19]

van de Moesdijk et al.

[11] 4,158,047

[45] Jun. 12, 1979

[54] PROCESS FOR THE PREPARATION OF A HYDROXYLAMINE SALT

[75] Inventors: Cornelis G. M. van de Moesdijk, Elsloo; Maria J. F. Smeets-Mertens, Nieuwenhagen, both of Netherlands

[73] Assignee: Stamicarbon, B.V., Geleen, Netherlands

[21] Appl. No.: 829,064

[22] Filed: Aug. 30, 1977

[30] Foreign Application Priority Data

Aug. 31, 1976 [NL] Netherlands ..................... 7609656

[51] Int. Cl.$^2$ ............................................. C01B 21/14
[52] U.S. Cl. ..................................... 423/387; 252/447
[58] Field of Search ................. 423/387, 388; 252/447

[56] References Cited

U.S. PATENT DOCUMENTS 3,996,165  12/1976  El Ghatta et al. .................. 423/387

FOREIGN PATENT DOCUMENTS 811651  4/1969  Canada ..................................... 423/387

Primary Examiner—O. R. Vertiz
Assistant Examiner—Thomas W. Roy
Attorney, Agent, or Firm—Cushman, Darby & Cushman

[57] ABSTRACT

A process for pre-treating platinum/palladium catalysts, used in the preparation of hydroxylamine, comprising contacting the same with an aqueous salt solution, inhibits (a) the decomposition of hydroxylamine and (b) the consequent formation of explosive mixtures of $N_2O$ with hydrogen or hydrocarbons.

8 Claims, No Drawings

PROCESS FOR THE PREPARATION OF A HYDROXYLAMINE SALT

This invention relates to a process for preparing a hydroxylamine salt wherein nitrate ions or nitrogen monoxide are reduced by means of hydrogen in an acid reaction medium in the presence of a catalyst containing platinum and/or palladium. More particularly, this invention relates to an improved catalyst pretreatment preparation for use in such process with the advantage of diminishing the occurrence of explosive mixtures.

BACKGROUND OF THE INVENTION

This type of hydroxylamine preparation process (see, e.g., U.S. Pat. No. 3,767,758 and the British Pat. Specification No. 772,693) is today used on a large scale. The hydroxylamine thus produced finds extensive use as starting material for the oximation of cyclohexanone into cyclohexanone oxime, which is in turn rearranged to form caprolactam.

In the production of hydroxylamine it has, however, been observed that when the hydroxylamine, in aqueous solution, is in contact with the catalyst containing platinum and/or palladium, and in the absence of hydrogen, it can decompose, with the formation of $N_2O$.

Under the usual process conditions used for the production of hydroxylamine, hydrogen is normally present in the liquid phase in the form of widely-dispersed small gas bubbles. Under those circumstances the said decomposition of hydroxylamine to $N_2O$ is normally not induced. However, in practice the hydroxylamine salt solution may in fact come in contact with the catalyst in the absence of hydrogen under certain circumstances. This is particularly true when the production process is for some reason temporarily interrupted or otherwise upset (e.g., for external reasons or equipment failure). In such an event, there is then the risk that (a) said decomposition will be induced and (b) the resulting $N_2O$ will form, with the hydrogen present outside the liquid phase, an explosive $N_2O/H_2$ mixture. Hydrocarbons, which may also be present in the hydrogen gas feedstreams, may also form an explosive mixture with the $N_2O$. (See e.g. Bulletin 503, 1952 and 627, 1965 Bur. of Mines). A substantial hazard is thus present under certain process upset conditions which may unavoidably occur during operation of the process, and which it has obviously been desirable to avoid.

OBJECT OF THE INVENTION

It is therefore an object of this invention to provide a method for minimizing the potential formation of such explosive mixtures by providing a special pre-treatment method for the catalyst system employed in the said hydroxylamine process.

DESCRIPTION OF THE INVENTION

It has now been found that the rate of this decomposition of the hydroxylamine salt, leading to the formation of $N_2O$, can be considerably reduced by first subjecting the catalyst system used in the said preparation of a hydroxylamine salt to a special pre-treatment.

This invention accordingly provides a catalyst pretreatment procedure which consists essentially in placing said catalyst in contact with an aqueous salt solution having a pH of about 1 to 3.5 at a temperature of about 60° to 140° C. The resulting catalyst may then be used for the production of hydroxylamine, as aforesaid, substantially free from hazard of $N_2O$ generation, and, at the same time, the activity of the catalyst is found to be only minimally affected.

In the pre-treatment of the catalyst according to the invention, various salts may be used to form the said aqueous salt solution. Examples of suitable salts include the alkali metal (e.g., sodium potassium, etc.) and ammonium water-soluble salts of mineral acids other than hydrochloric acid (e.g., salts of nitric acid, sulfuric acid, phosphoric acid) or simple aliphatic organic acids (e.g., acetic acid, propionic acid, formic acid and oxalic acid). The use of a nitrate salt in the aqueous salt solution, will generally be effective to give good results in a shorter treating period than other salts. The concentration of the aqueous salt solution may vary within relatively wide limits, e.g., a concentration of from about 2 to 50% by weight. However, in the lower end of such concentration range, the required pre-treatment time to obtain the desired results tends to be longer.

According to this invention, the catalyst is preferably pre-treated with the aqueous salt solution at a pH of about 1.5 to 2.5. Below a pH of 1.5, the noble metal component of the catalyst tends to dissolve slightly. Above a pH of about 2.5 the effect of the treatment to lower the aforesaid rate of decomposition of the hydroxylamine is slightly decreased. Advantageous results can, however, be realized within the stated pH range of 1 3.5.

The temperature range within which the pre-treatment of the catalyst is effected may be varied between about 60° C. up to about 140° C. A temperature of between 75° and 100° C. is most suitable. Atmospheric pressure may then be used for the treatment, and good results are obtained.

The required duration for the pre-treatment may also vary. In practice, the desired effects will generally be achieved, within a period of about 5–80 hours. The minimum time required depends somewhat on the pH and temperature employed; the higher the temperature and the lower the pH, the shorter will be the required treating time. For instance at a pH of 1.5 and a temperature of 80° C. a treating time of 25 hours is sufficient to achieve the desired effect.

During this pre-treatment, an inert gas (such as, e.g., nitrogen, carbon dioxide or helium), is preferably passed through the said aqueous salt solution in order to exclude atmospheric and molecular oxygen from the system. The presence of such oxygen might otherwise cause some dissolution and loss of the noble metal content of the catalyst system.

These inert gases so used need not be completely pure gases, and may contain, e.g., a small amount of hydrogen, up to for instance, up to about 1% by volume.

The pressure employed in the pre-treatment is not in itself critical. However, when temperatures above the normal boiling point of the aqueous solution are used, the treatment must, of course, be effected under elevated pressure sufficient to maintain the liquid state.

Of course, the development of a catalyst treatment which would avoid the explosive mixture problem, but which would at the same time interfere with the basic required catalytic activity would be of little practical value.

However, when using the catalyst which has undergone the said pre-treatment of this invention, it has now also been found that the selectivity of the catalyst has not changed, while the activity of the treated catalyst is only slightly lower than the activity of the untreated catalyst. This slight decrease in the catalyst activity can be compensated for in practice by the use of only slightly larger amounts of treated catalyst in the reduction process.

This advantageous combination of results, namely inhibition of the said hydroxylamine decomposition while retaining high catalyst activity for the reaction was unpredictable prior to the development of this invention.

The invention will now be further elucidated by means of the following examples.

EXAMPLE I

Catalyst (30 grams) was kept suspended in an aqueous salt solution (5000 grams) for a period of 25 hours at a temperature of 80° C., in a 5-liter flask provided with a stirrer and a reflux condenser. The catalyst used was a palladium-platinum catalyst on a carbon carrier (8% by weight of palladium; 2% by weight of platinum), which is commonly commercially available (and see the above-cited U.S. and British patent disclosures).

The said 5000 grams of aqueous salt solution contained, in addition to water, 10.5 moles of phosphoric acid, 14 moles of ammonium nitrate and sufficient ammonia water (25% by weight) so that the pH of the solution amounted to 1.5.

During this pre-treatment, nitrogen gas (containing about 0.1% by volume of $H_2$) was passed through the suspension at a rate of about 2 liters per minute.

After the 25-hour period the catalyst was removed from the aqueous salt solution (e.g., by filtration) and prepared for use in the tests described below.

TEST (a). Pre-treated catalyst effect on hydroxylamine decomposition. To examine the effect on the decomposition of hydroxylamine, 1200 grams of an aqueous reaction solution (pH 1.7) obtained by reduction of nitrate ions and containing, per kilogram of said solution, 0.5 mole of monohydroxylammonium phosphate, 0.2 mole of ammonium nitrate, 0.9 mole of monoammonium phosphate, and 0.7 mole of phosphoric acid was placed in contact for 8 hours at a temperature of 60° C. with 6 grams of the thusly pre-treated catalyst.

During this decomposition test helium was passed through the aqueous reaction solution to remove the $N_2O$ formed. The mixture of helium and $N_2O$ was then analyzed by gas-chromatograph. On an average 8 millimoles of $N_2O$ were formed and 30 millimoles of hydroxylamine were decomposed per hour.

TEST (b). Comparative non-treated catalyst effect on the rate of hydroxylamine decomposition. The decomposition experiment (a) was repeated with the same materials and under the same conditions, except that the catalyst had not received the foregoing pre-treatment. Within a period of 1.5 hours, already 64 millimoles of $N_2O$ had been formed while 240 millimoles of hydroxylamine had decomposed. Hence the rate of decomposition was considerably higher.

TEST (c). Effect of pre-treatment on catalyst selectivity and activity. To determine the effect of the catalyst pre-treatment on the selectivity and activity of the catalyst, an amount of catalyst pre-treated as described above was next used for the preparation of hydroxylammonium phosphate, as follows:

(i) At a temperature of about 60° C. and a hydrogen pressure of 10 atmospheres, nitrate ion was continuously reduced catalytically to hydroxylamine in a reactor having an effective capacity of 3 liters and provided with a stirrer and 4 filter candles of sintered steel. The aqueous solution fed to the reactor (10.5 kilograms per hour) contained 2 moles of phosphoric acid and 2.8 moles of ammonium nitrate per kilogram.

The stirrer speed was 2000 revolutions per minute. The reactor contained 20 grams of catalyst mass.

At 10-minute intervals the amount of catalyst collected on the filter candles was returned to the reaction liquid by means of a short pressure surge.

The amount of nitrate solution added per unit time depended on the activity of the catalyst. The reaction liquid (at a pH of 1.8) was discharged through the filter candles. A constant production of 120 grams of hydroxylamine (present as dissolved monohydroxylammonium phosphate) per hour was obtained per gram of noble metal in the catalyst. This situation could be maintained continuously for one week without any significant differences, after which the experiment was terminated.

(ii) When this experiment was repeated using the same catalyst, but without the pre-treatment, the same production result could be obtained with 18 grams of catalyst, instead requiring 20 grams. This comparison shows that the activity of the catalyst decreased only slightly as a result of the pre-treatment, while the selectivity is not adversely affected.

EXAMPLE II

The same pre-treatment as described in Example I was carried out, except for a period of 70 hours, and that the aqueous salt solution had a pH of 2. This aqueous salt solution was in this instance obtained by neutralizing an aqueous solution containing 2.8 moles/kg of $NH_4NO_3$ and 2.1 moles/kg of $H_3PO_4$ adjusted to a pH of 2 by addition of the required amount of 25%-by-weight $NH_3$ water. During the pre-treatment, helium was passed through the solution at the rate of 1.5 liter/minute. The following tests were then performed.

TEST (a). Effect on decomposition of hydroxylamine.

To study the effect on the decomposition of hydroxylamine, 6 grams of the thus pre-treated catalyst were put into contact, for 20 hours at 60° C., with 1 liter of an aqueous reaction solution obtained by reduction of nitrogen monoxide. This solution contained 0.7 mole of phosphoric acid, 0.5 mole of monoammonium phosphate, and 1.3 moles of monohydroxylammonium phosphate per kg.

In this experiment helium was passed through the aqueous reaction solution to discharge the $N_2O$ formed. The He — $N_2O$ mixture was then analyzed by gas chromatograph. On an average, 9 millimoles of $N_2O$ had been formed and 35 millimoles of hydroxylamine had decomposed per hour.

TEST (b). Comparison of the rate of decomposition with untreated catalyst. When this experiment was repeated for 4 hours using the same aqueous reaction solution, but with untreated catalyst, an average of 170 millimoles of hydroxylamine had decomposed and 40 millimoles of $N_2O$ had formed per hour.

EXAMPLE III

In the way described in Example I, 30 grams of catalyst were kept suspended in 5000 grams of an aqueous solution for 25 hours at a temperature of 95° C.

The catalyst was a commercially available palladium-platinum catalyst on a carrier of active carbon (8% by weight of palladium, 2% by weight of platinum). The aqueous solution consisted of water, 14 moles of $H_3PO_4$ and sufficient ammonia water (25% by weight) so that the pH was adjusted to 1.7.

During the treatment carbon dioxide was passed through the suspension at the rate of 2 liters per minute. The following tests were then performed.

TEST (a). Effect of pre-treatment on hydroxylamine decomposition. To study the effect of this catalyst pre-treatment on the decomposition of hydroxylamine, 6 grams of the pre-treated catalyst were put into contact, for 2 hours at 60° C., with 1 liter of an aqueous reaction solution obtained by reduction of nitrate ion. This aqueous reaction solution contained 0.7 mole of monohydroxylammonium phosphate, 1.9 moles of ammonium nitrate, 0.9 monoammonium phosphate and 0.45 mole of phosphoric acid.

In this experiment helium was passed through the solution to remove the $N_2O$ formed.

On an average, 15.4 millimoles of $N_2O$ had formed and 59 millimoles of hydroxylamine had decomposed, per hour.

TEST (b). Comparison of the rate of decomposition with untreated catalyst. Repetition of this experiment, except for using the same catalyst but without pre-treatment, gave an average $N_2O$ formation of 70 millimoles per hour.

EXAMPLE IV

In the way described in Example III, the same catalyst was treated at 80° C. for 70 hours in 5000 grams of a solution consisting of water, 16 moles of $H_3PO_4$ and sufficient $NH_3$ water (25% by weight) to bring the pH to a level of 3. During the treatment, nitrogen (contaminated with 0.3% by volume of $H_2$) was passed through the suspension at the rate of 1.5 liters per minute.

The decomposition of hydroxylamine with the thus pre-treated catalyst, determined in the way described in Example III, gave rise to the formation of 27 millimoles of $N_2O$ per hour on an average.

The procedures described in the foregoing examples may also be employed for the pre-treatment of catalysts having compositions other than that used in said examples. For instance, suitable platinum-containing catalysts may contain from 1% to about 15% by weight of platinum; for palladium-containing catalyst from 1% to about 15% of palladium may be present; for combinations, the total noble metal content may range from about 1% to 15%, with the ratio of platinum to palladium ranging from about 0.01:1 to 0.5:1. Said weight percents are based upon the total catalyst composition. Instead of carbon as the catalyst carrier there may alternatively be used e.g. graphite, silica gel or aluminium oxide as catalyst carriers (see e.g., U.S. Pat. No. 3,514,254 and No. 3,663,166).

EXAMPLES V–VIII

The procedure described in Example I was repeated for the pre-treatment of other palladium-platinum-on coal catalysts which are commonly commercially available. The effect of the treatment on the rate of decomposition of hydroxylamine (examined as described in Example I) as summarized in the following table:

| Example | pd % by weight | pt % by weight | average amount of millimoles $N_2O$ formed per hour | |
|---|---|---|---|---|
| | | | before treatment | after treatment |
| V | 10 | 0 | 2 | 0.4 |
| VI | 8.9 | 0.63 | 4 | 0.85 |
| VII | 7 | 2.4 | 35 | 3.2 |
| VIII | 2.7 | 6.3 | 50 | 4 |

What is claimed is:

1. A process for the inhibition of decomposition of hydroxylamine salts during the preparation of hydroxylamine, which preparation includes the reduction in an aqueous acid medium of nitrate ions or of nitrogen monoxide in the presence of a catalyst composition containing platinum or palladium or a combination of said metals, which comprises subjecting, in the absence of hydroxylammonium salt, said catalyst to a pre-treatment of contacting the same with an aqueous salt solution having pH between about 1 and 3.5, and at a temperature between about 60° to 190° C., and with agitation, for a period of time requiring between about 5 to 80 hours, in the substantial absence of molecular oxygen.

2. The process of claim 1, wherein said temperature is between about 75° to 100° C.

3. The process of claim 1, wherein said pH is between about 1.5 to 2.5.

4. The process of claim 1, wherein said aqueous salt solution is composed of aliphatic organic salts or of water soluble alkali metal salts or ammonium salts of mineral acids other than hydrochloric acid.

5. The process of claim 4, wherein said salt is present at a concentration of between about 2 to 50% by weight of said aqueous salt solution.

6. The process of claim 4, wherein said salt solution contains a nitrate.

7. The process of claim 1, wherein an inert gas is introduced into said solution during said agitation to exclude molecular oxygen therefrom.

8. The process of claim 7, wherein said inert gas is nitrogen, carbon dioxide or helium.

* * * * *